United States Patent
Chen

(10) Patent No.: US 6,955,202 B2
(45) Date of Patent: Oct. 18, 2005

(54) AUXILIARY WHEEL RIM

(76) Inventor: Yueh Nu Chen, 5F, No. 15, Nu Chung Rd., I Lan City (TW)

(*) Notice: Subject to any disclaimer, the term of this patent is extended or adjusted under 35 U.S.C. 154(b) by 136 days.

(21) Appl. No.: 10/722,492

(22) Filed: Nov. 28, 2003

(65) Prior Publication Data

US 2005/0087279 A1    Apr. 28, 2005

(30) Foreign Application Priority Data

Oct. 24, 2003  (TW) .............................. 92129687 A

(51) Int. Cl.[7] .......................................... B60C 17/04
(52) U.S. Cl. ................................................. 152/520
(58) Field of Search ............................... 152/158, 520

(56) References Cited

U.S. PATENT DOCUMENTS

| 3,142,326 A | * | 7/1964 | Lindley | 152/158 |
| 3,645,312 A | * | 2/1972 | Kolodziej | 152/158 |
| 4,572,260 A | * | 2/1986 | Ordu | 152/158 |

* cited by examiner

*Primary Examiner*—Adrienne C. Johnstone
(74) *Attorney, Agent, or Firm*—Rosenberg, Klein & Lee

(57) ABSTRACT

An auxiliary wheel rim for use in a vehicle wheel for enabling the car driver to drive the car to the repair shop safely upon explosion of the tire is disclosed to include a plurality of first rim element, a second rim element, a third rim element, a plurality of links respectively fastened to the lugs of the first, second and third rim elements with pins to connect the first rim elements in series between the second rim element and the third rim element; and screw bolt fastened to the second and third rim elements to connect the linked first, second and third rim elements into the desired annular auxiliary wheel rim.

1 Claim, 5 Drawing Sheets

AUXILIARY WHEEL RIM

BACKGROUND OF THE INVENTION

1. Field of the Invention

The present invention relates to vehicle tires and, more particularly, to an auxiliary wheel rim for use in a vehicle tire.

2. Description of the Related Art

Conventional vehicle tires include two types, namely, the one with inner tube and the other without inner tube. A tire with an inner tube is inflatable. When the inner tube of a tire pierced by a pointed external object, it leaks, and the driver must stop the car immediately. A sudden explosion of a tire may cause a traffic accident when the car is running on a freeway. A tubeless tire or the so-called high-speed tire does not explode when pierced by a pointed external object, giving a sufficient time to let the driver drive the car to a garage for repair. However, because no significant tire pressure loss is shown when one tire of the car was pierced by a pointed external object, the driver may keep driving the car on a highway or freeway. In this case, an accident may occur.

Therefore, it is desirable to provide an auxiliary wheel rim for a vehicle wheel that eliminates the aforesaid problems.

SUMMARY OF THE INVENTION

The present invention has been accomplished under the circumstances in view. It is the main object of the present invention to provide an auxiliary wheel rim, which allows the car driver to keep driving the car safety for a certain period of time upon an explosion of the tire. It is another object of the present invention to provide an auxiliary wheel rim, which is easy to install. It is still another object of the present invention to provide an auxiliary wheel rim, which fits tires of different sizes.

To achieve these and other objects of the present invention, the auxiliary wheel rim comprises a plurality of first rim elements, the first rim elements each comprising a top wall fitting the curvature of the wheel rim of a vehicle wheel, a smoothly arched bottom wall reinforced with at least one reinforcing rib, a middle support connected between the top wall and bottom wall of the respective first rim element on the middle, and two end supports connected between the top wall and bottom wall of the respective first rim element at two distal ends, the end supports of the first rim element each having two outwardly protruding lugs; a second rim element, the second rim element comprising a top wall fitting the curvature of the wheel rim of a vehicle tire, a smoothly arched bottom wall reinforced with at least one reinforcing rib, a middle support connected between the top wall and bottom wall of the second rim element on the middle, a first end support connected between the top wall and bottom wall of the second rim element at one end, a second end support connected between the top wall and bottom wall of the second rim element at an opposite end, the first end support of the second rim element having two outwardly protruding lugs, the second end support of the second rim element having a countersunk screw hole and a tool hole; a third rim element, the third rim element comprising a top wall fitting the curvature of the wheel rim of a vehicle tire, a smoothly arched bottom wall reinforced with at least one reinforcing rib, a middle support connected between the top wall and bottom wall of the third rim element on the middle, a first end support connected between the top wall and bottom wall of the third rim element at one end, a second end support connected between the top wall and bottom wall of the third rim element at an opposite end, the first end support of the third rim element having two outwardly protruding lugs, the second end support of the third rim element having a countersunk screw hole and a tool hole respectively disposed corresponding to the countersunk screw hole and tool hole of the second rim element, and two flanges disposed at two opposite lateral sides and adapted to support the second end support of the second rim element on the second end support of the third rim element; a plurality of links respectively fastened to the lugs of the first rim elements and the lugs of the second rim element and the lugs of the third rim element with pins to connect the first rim elements in series between the second rim element and the third rim element; and a screw bolt fastened to the countersunk screw hole of the second end support of the second rim element and the countersunk screw hole of the second end support of the third rim element to secure the second end support of the second rim element to the second end support of the third rim element.

DETAILED DESCRIPTION OF THE PREFERRED EMBODIMENT

Figure 1:
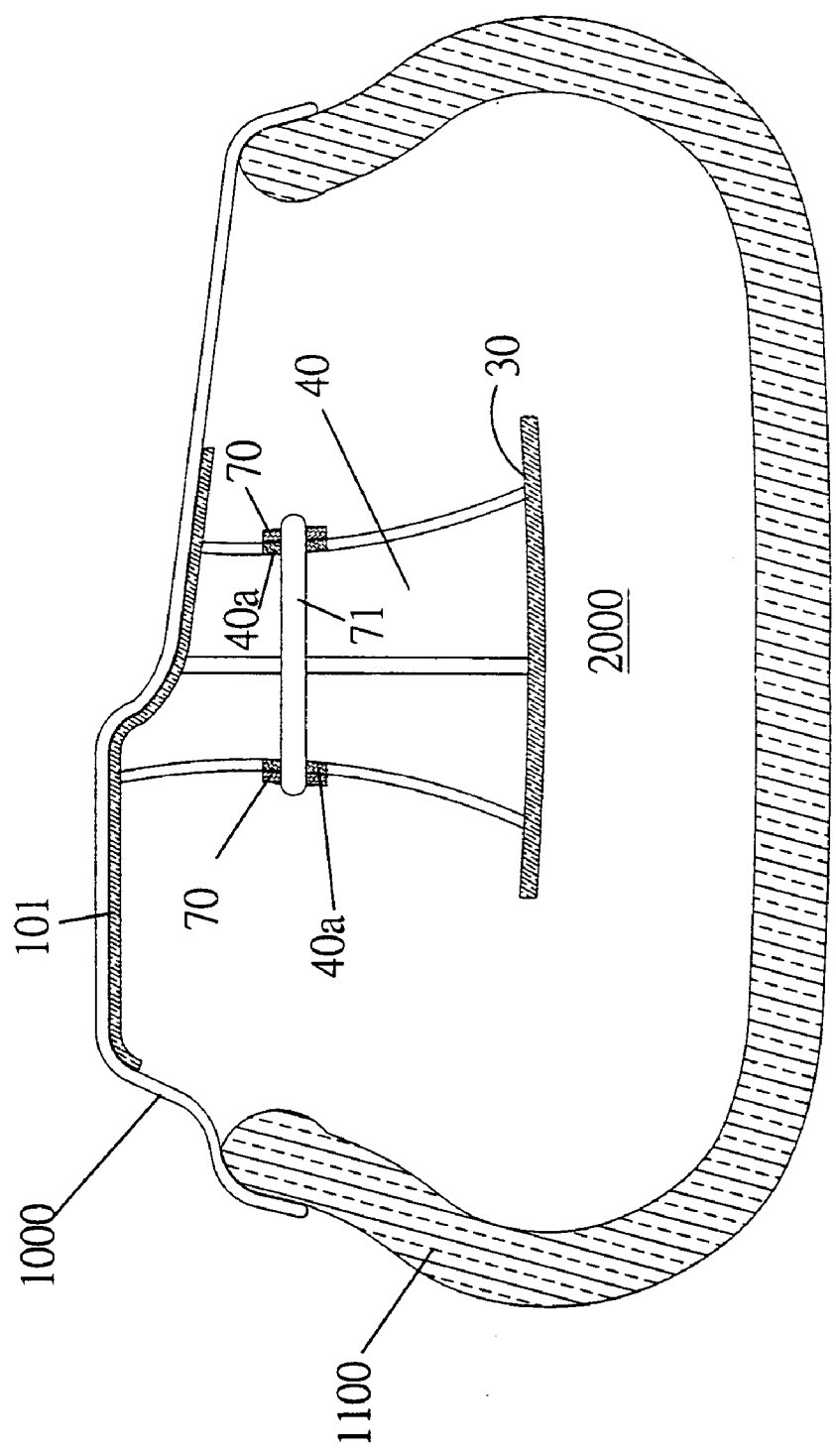
FIG. 1 is a sectional view showing an auxiliary wheel rim installed in a vehicle inside the tire.
Figure 2:
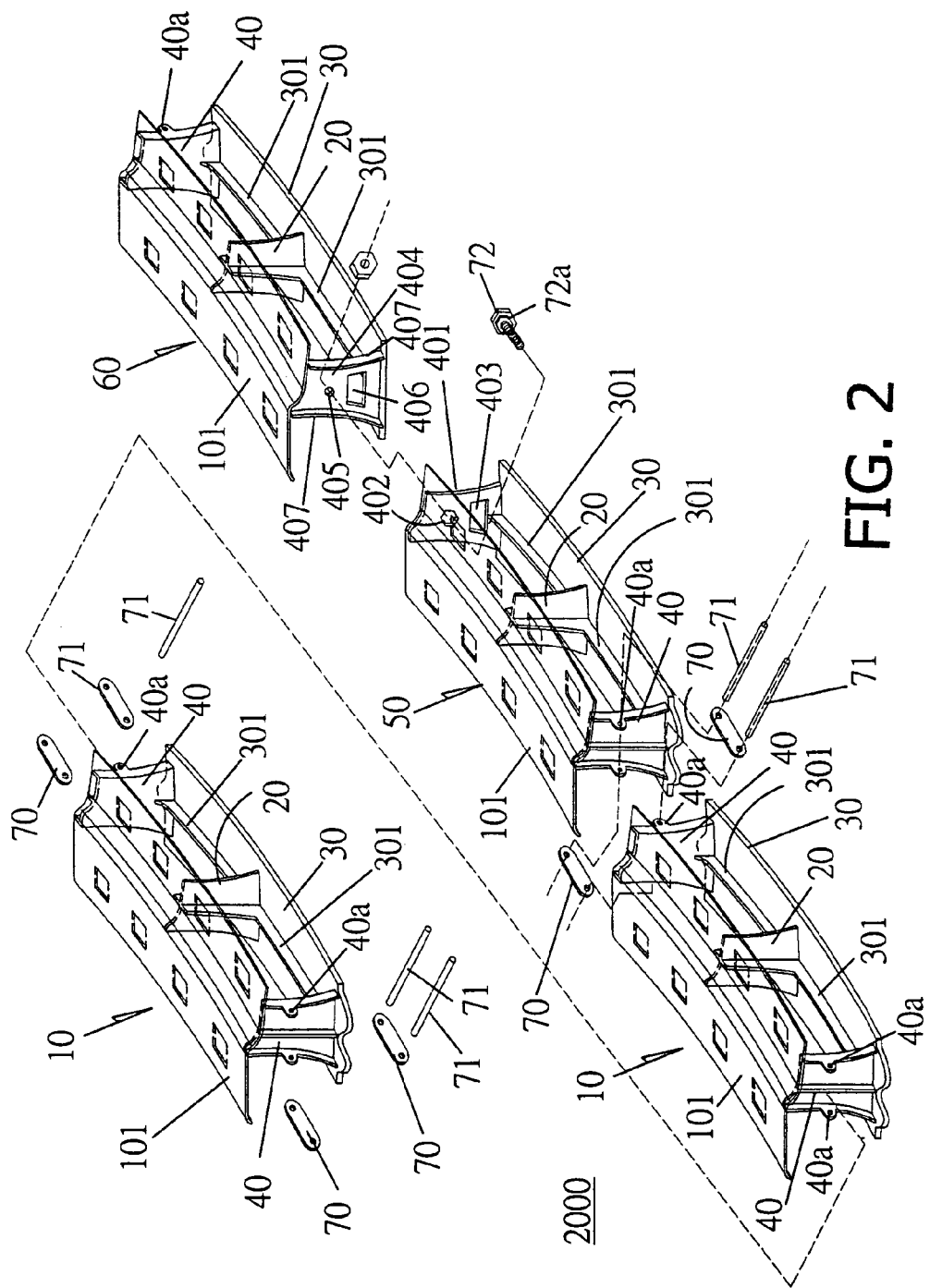
FIG. 2 is an exploded view of a part of an auxiliary wheel rim according to the present invention.

Referring to FIG. 1, an auxiliary wheel rim 2000 is shown comprised of a plurality of first rim elements 10, a second rim element 50, a third rim element 60, a screw bolt 72, a plurality of links 70, and a plurality of pins 71. The screw bolt 72 has a polygonal shoulder 72a.

Each first rim element 10 comprises a top wall 101 fitting the curvature of the wheel rim 1000, a smoothly arched bottom wall 30, a middle support 20 connected between the top wall 101 and the bottom wall 30 on the middle, and two end supports 40 connected between the top wall 101 and the bottom wall 30 at two distal ends. The bottom wall 30 has a reinforcing rib 301 extended along the length and formed integral with the middle support 20 and the end supports 40. The end supports 40 each have two outwardly protruding lugs 40a.

The second rim element 50 comprises a top wall 101 fitting the curvature of the wheel rim 1000, a smoothly arched bottom wall 30, a middle support 20 connected between the top wall 101 and the bottom wall 30 on the middle, a first end support 40 connected between the top wall 101 and the bottom wall 30 at one end, a second end support 401 connected between the top wall 101 and the bottom wall 30 at the other end. The bottom wall 30 has a reinforcing rib 301 extended along the length and formed integral with the middle support 20 and the first end support 40, and the second end support 401. The first end support 40 has two outwardly protruding lugs 40a. The second end support 401 has a countersunk screw hole 402 and a through hole 403.

The third rim element 60 comprises a top wall 101 fitting the curvature of the wheel rim 1000, a smoothly arched bottom wall 30, a middle support 20 connected between the top wall 101 and the bottom wall 30 on the middle, a first end support 40 connected between the top wall 101 and the bottom wall 30 at one end, a second end support 404 connected between the top wall 101 and the bottom wall 30 at the other end. The bottom wall 30 has a reinforcing rib 301 extended along the length and formed integral with the middle support 20 and the first end support 40, and the second end support 404. The first end support 40 has two outwardly protruding lugs 40a. The second end support 404 has a countersunk screw hole 405, a through hole 406, and two flanges 407 disposed at two opposite lateral sides. Further, in order to diminish material consumption and the weight, the top walls 101 of the first rim elements 10, second rim element 50 and third rim element 60 are made having through holes. Additional reinforcing ribs may be made on the bottom walls 30 of the first rim elements 10, second rim element 50 and third rim element 60 to reinforce the structural strength.

Figure 3:
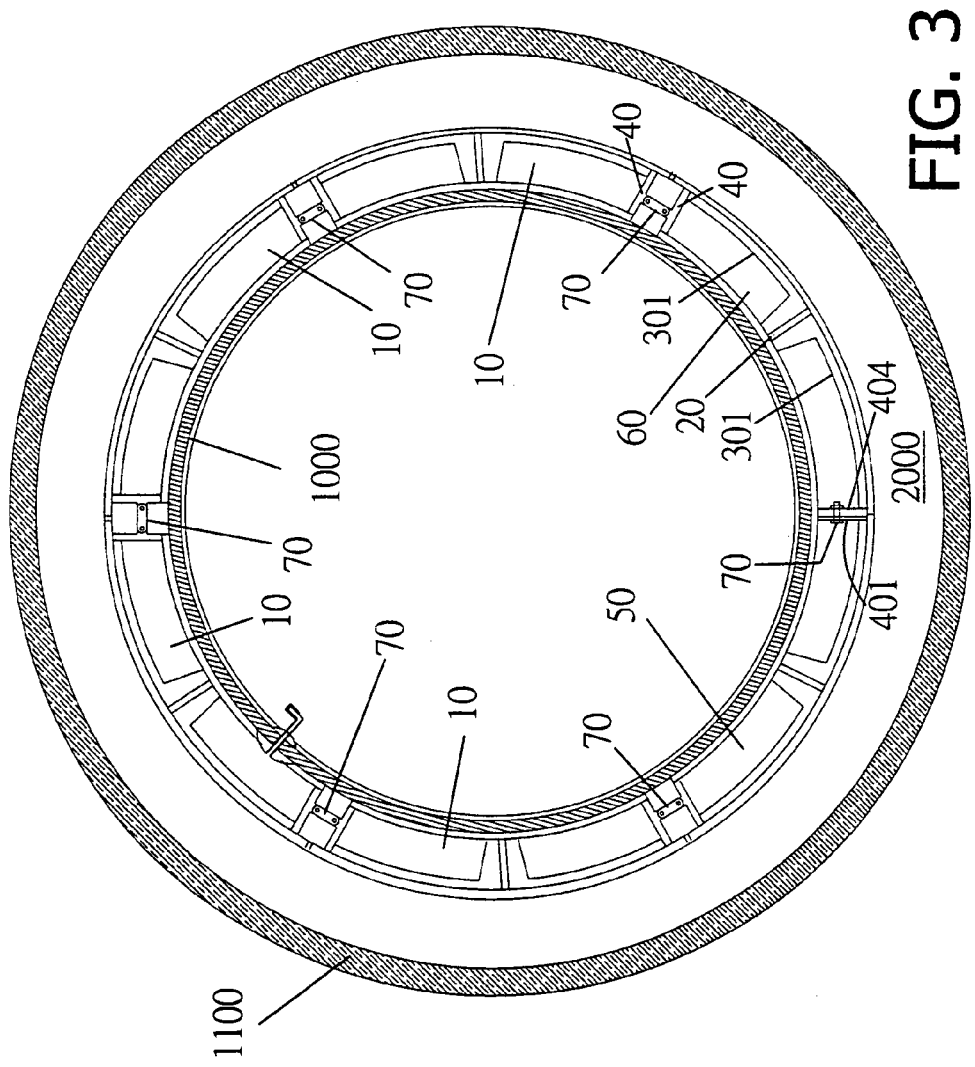
FIG. 3 is another sectional view of the vehicle wheel shown in FIG. 1.
Figure 4:
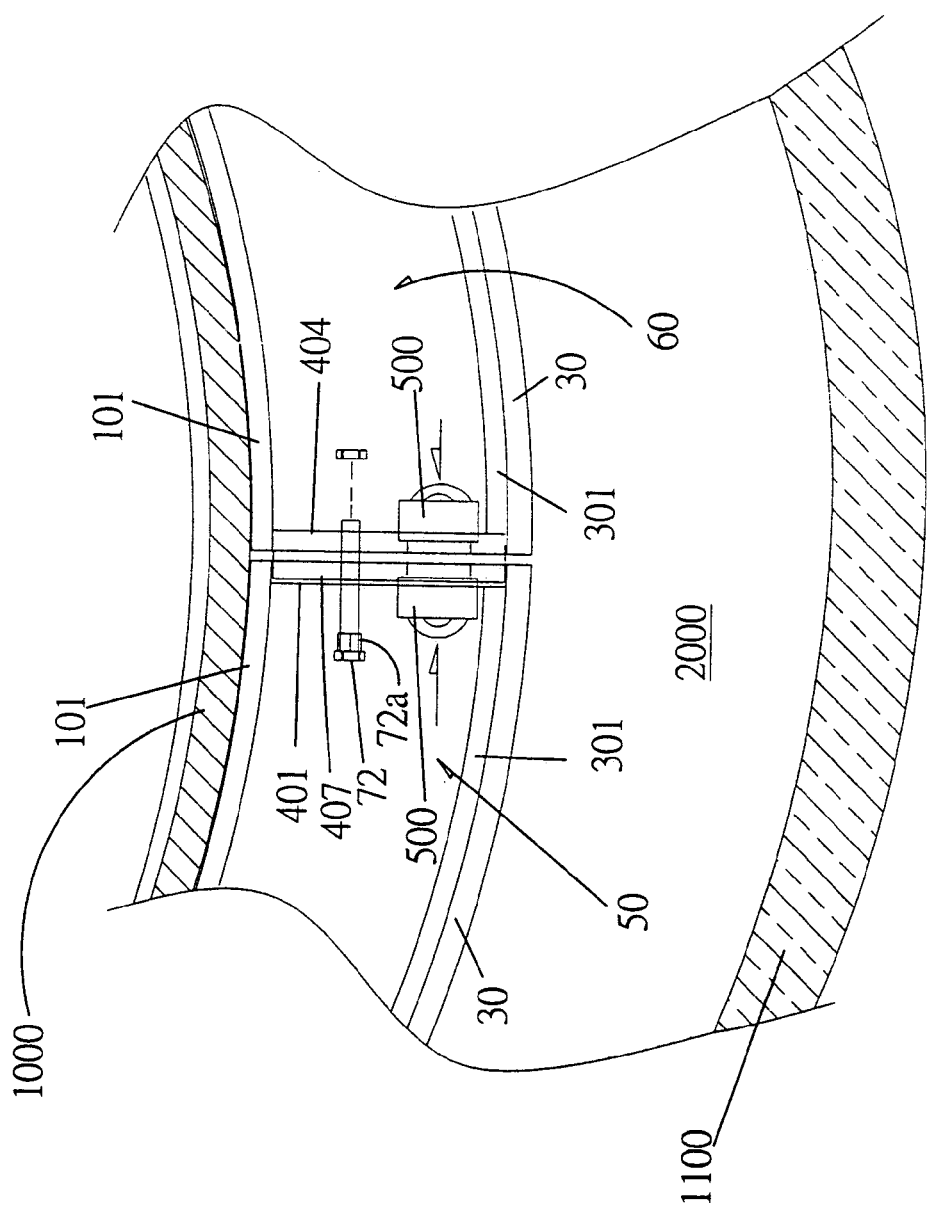
FIG. 4 is a schematic drawing showing the connection between the second end support of the second rim element and the second end support of the third rim element during installation of the present invention.
Figure 5:
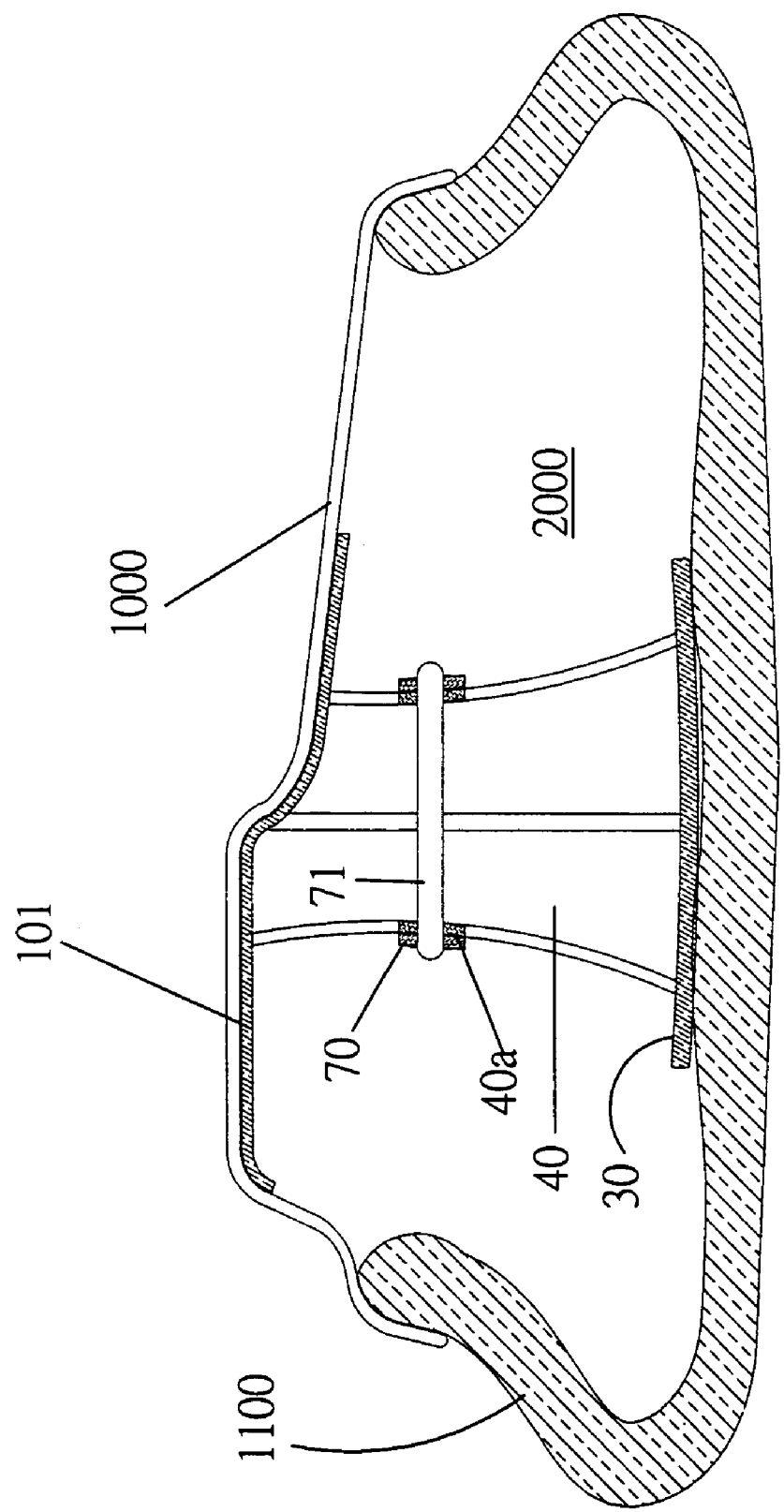
FIG. 5 is a schematic drawing showing the supporting status of the exploded tire on the auxiliary wheel rim according to the present invention.

Referring also to FIGS. 3~5, the links 70 are respectively fastened to the lugs 40a by the pins 71 to connect the first rim elements 10, the second rim element 50 and the third rim element 60 in series, and then the second end support 401 of the second rim element 50 and the second end support 404 of the third rim element 60 are attached together, forming with the first rim elements 10 the desired annular auxiliary wheel rim 2000. The auxiliary wheel rim 2000 thus obtained is then inserted into the inside of a tire 1100, and then the tire 1100 with the auxiliary wheel rim 2000 are attached to the wheel rim 1000. During installation, one side of the tire 1100 is covered on the wheel rim 1000, and then insert two magnets 500 into the through holes 403 and 406 of the second end supports 401 and 404 to secure the second end supports 401 and 404 together, and then fasten the screw bolt 72 to the countersunk screw holes 402 and 405 to firmly secure the two second end supports 401 and 404 together, keeping the second end support 401 of the second rim element 50 stopped between the flanges 407 of the second end support 404 of the third rim element 60. After removal of the magnets 500, the other side of the tire 1100 is covered on the wheel rim 1000, finishing the installation.

If the tire leaks during running, the auxiliary wheel rim 2000 supports the wheel in functioning, enabling the driver to drive the car to a repair shop safely for further repair.

A prototype of auxiliary wheel rim has been constructed with the features of FIGS. 1~5. The auxiliary wheel rim functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An auxiliary wheel rim comprising:

a plurality of first rim elements, said first rim elements each comprising a top wall fitting the curvature of the wheel rim of a vehicle wheel, a smoothly arched bottom wall reinforced with at least one reinforcing rib, a middle support connected between the top wall and bottom wall of the respective first rim element on the middle, and two end supports connected between the top wall and bottom wall of the respective first rim element at two distal ends, the end supports of said first rim element each having two outwardly protruding lugs;

a second rim element, said second rim element comprising a top wall fitting the curvature of the wheel rim of a vehicle tire, a smoothly arched bottom wall reinforced with at least one reinforcing rib, a middle support connected between the top wall and bottom wall of said second rim element on the middle, a first end support connected between the top wall and bottom wall of said second rim element at one end, a second end support connected between the top wall and bottom wall of said second rim element at an opposite end, the first end support of said second rim element having two outwardly protruding lugs, the second end support of said second rim element having a countersunk screw hole and a tool hole;

a third rim element, said third rim element comprising a top wall fitting the curvature of the wheel rim of a vehicle tire, a smoothly arched bottom wall reinforced with at least one reinforcing rib, a middle support connected between the top wall and bottom wall of said third rim element on the middle, a first end support connected between the top wall and bottom wall of said third rim element at one end, a second end support connected between the top wall and bottom wall of said third rim element at an opposite end, the first end support of said third rim element having two outwardly protruding lugs, the second end support of said third rim element having a countersunk screw hole and a tool hole respectively disposed corresponding to the countersunk screw hole and tool hole of said second rim element, and two flanges disposed at two opposite lateral sides and adapted to support the second end support of said second rim element on the second end support of said third rim element;

a plurality of links respectively fastened to the lugs of said first rim elements and the lugs of said second rim element and the lugs of said third rim element with pins to connect said first rim elements in series between said second rim element and said third rim element; and a screw bolt fastened to the countersunk screw hole of the second end support of said second rim element and the countersunk screw hole of the second end support of said third rim element to secure the second end support of said second rim element to the second end support of said third rim element.

* * * * *